US012806582B2

(12) United States Patent
Kang

(10) Patent No.: US 12,806,582 B2
(45) Date of Patent: Nov. 24, 2026

(54) TURBINE ASSISTED VENTURI MIXER

(71) Applicant: Samuel Kang, Panania (AU)

(72) Inventor: Samuel Kang, Panania (AU)

(*) Notice: Subject to any disclaimer, the term of this patent is extended or adjusted under 35 U.S.C. 154(b) by 374 days.

(21) Appl. No.: 18/685,159

(22) PCT Filed: Sep. 16, 2022

(86) PCT No.: PCT/AU2022/051115
§ 371 (c)(1),
(2) Date: Feb. 20, 2024

(87) PCT Pub. No.: WO2023/039634
PCT Pub. Date: Mar. 23, 2023

(65) Prior Publication Data

US 2025/0001372 A1 Jan. 2, 2025

(30) Foreign Application Priority Data

Sep. 17, 2021 (AU) ................................ 2021903003

(51) Int. Cl.

| | |
|---|---|
| ***B01F 25/312*** | (2022.01) |
| ***B01F 23/2326*** | (2022.01) |
| ***B01F 23/237*** | (2022.01) |
| ***B01F 35/91*** | (2022.01) |
| ***C02F 7/00*** | (2006.01) |
| *B01F 35/90* | (2022.01) |

(Continued)

(52) U.S. Cl.
CPC .... *B01F 25/31241* (2022.01); *B01F 23/2326* (2022.01); *B01F 23/237611* (2022.01); *B01F 25/31252* (2022.01); *B01F 35/91* (2022.01); *C02F 7/00* (2013.01); *B01F 2035/99* (2022.01); *B01F 2101/305* (2022.01); *C02F 2103/007* (2013.01)

(58) Field of Classification Search
CPC .......... B01F 23/2326; B01F 23/237611; B01F 25/31241; B01F 25/31252; B01F 35/91; B01F 2035/99; B01F 2101/305; C02F 7/00; C02F 2103/007
See application file for complete search history.

(56) References Cited

U.S. PATENT DOCUMENTS 4,297,111 A * 10/1981 Ross ...................... B01D 53/18
95/220
4,514,343 A 4/1985 Cramer et al.
5,647,221 A 7/1997 Garris, Jr.
(Continued)

FOREIGN PATENT DOCUMENTS

| | | | |
|---|---|---|---|
| CN | 113069949 | A | 7/2021 |
| DE | 1081610 | B | 5/1960 |
| WO | 0074831 | A1 | 12/2000 |

OTHER PUBLICATIONS

International Search Report & Written Opinion dated Dec. 19, 2022 from PCT Application No. PCT/AU2022/051115 (10 pp).

*Primary Examiner* — Charles S Bushey
(74) *Attorney, Agent, or Firm* — INNOVATION CAPITAL LAW GROUP, LLP; Vic Lin

(57) ABSTRACT

A turbine assisted Venturi mixer has a first and second fluid channels leading to a Venturi for mixing fluids separately introduced via the channels. The mixer is assisted with a compressor powered by a turbine turned by fluid flow through the second channel and acting between the channels to pump fluid through the first channel.

27 Claims, 1 Drawing Sheet

(51) Int. Cl.

| | |
|---|---|
| *B01F 101/00* | (2022.01) |
| *C02F 103/00* | (2006.01) |

(56) References Cited

U.S. PATENT DOCUMENTS

| | | | |
|---|---|---|---|
| 6,029,911 | A | 2/2000 | Watanabe et al. |
| 9,695,785 | B2 * | 7/2017 | Roth ...................... F02M 26/28 |
| 2003/0015596 | A1 | 1/2003 | Evans |
| 2005/0173107 | A1 | 8/2005 | Heilmann et al. |
| 2010/0212764 | A1 | 8/2010 | Grizzle et al. |
| 2015/0285192 | A1 | 10/2015 | Roth et al. |
| 2016/0265779 | A1 | 9/2016 | Haynes et al. |
| 2018/0058388 | A1 | 3/2018 | Zhang et al. |
| 2021/0199299 | A1 | 7/2021 | Berry et al. |

* cited by examiner

TURBINE ASSISTED VENTURI MIXER

FIELD OF THE INVENTION

This invention relates generally to Venturi mixers and, more particularly, this invention relates to a Venturi mixer employing turbine assistance to increase suction of one of the fluid channels thereof.

BACKGROUND OF THE INVENTION

The Venturi effect is the reduction in fluid pressure that results when a fluid flows through a constricted section (or choke) of a pipe.

FIG. 1 shows a mixer 116 employing a Venturi to mix fluids, such as to mix a liquid with a gas. Specifically, the mixer 116 comprises a constricting nozzle 117 leading to a dilating chamber 118. If a pump forces fluid through an inlet 119 of the mixer 116, the constricting nozzle increases the velocity of the fluid whereas the dilating chamber 118 decreases the velocity of the fluid, thereby sucking fluid in via a second inlet 120 of the mixer 116. A mixture of the fluids will flow from an outlet 121 of the mixer 116.

However, Venturi mixers of the type of FIG. 1 fails to work if pressure differential exceeds suction at the second inlet 120. For example, in relatively high-pressure environments such as wherein the mixer 116 is submerged in water, the suction at the second inlet 120 may be insufficient to draw in air at atmospheric pressure. Water level fluctuations may cause this problem intermittently.

This problem may be ameliorated somewhat by increasing the velocity of fluid via the first inlet 119 or alternatively having a secondary pump subsystem to pressurise fluid at the second inlet 120.

The present invention seeks to provide a way, which will overcome or substantially ameliorate at least some of the deficiencies of the prior art, or to at least provide an alternative.

SUMMARY OF THE DISCLOSURE

There is provided herein a mixer comprising a first and second fluid channels leading to a Venturi for mixing.

The mixer comprises a compressor powered by a turbine turned by fluid flow through the second channel and acting between the channels to pump fluid through the first channel.

The compressor may comprise a compressor wheel which compresses fluid axially to radially with respect to the compressor wheel. Alternatively, the compressor may comprise a piston-type compressor. Generally, a compressor wheel would be used for lower density fluid such as gases whereas a piston-type compressor would be used for higher density fluids such as liquids.

The turbine may comprise a turbine wheel which is turned by fluid flow going radially to axially with respect to the turbine wheel.

Gearing may act between the turbine wheel and the compressor wheel to control the speed of the compressor wheel, such as wherein the speed of the speed of the compressor wheel is increased where the second channel is used for high density fluids such as liquids and the first channel is used for lower density fluids such as an air.

The present mixer may comprise a compact configuration wherein the compressor wheel, turbine wheel and/or compressor nozzle are coaxial.

A bypass may take the first channel around the turbine wheel and may comprise a heat exchanger to introduce heat to favour fluid vaporisation or alternatively to dissipate compressively generated heat. The heat exchanger may be configured to introduce heat according to a flash point of a type of fluid flowing therethrough.

The bypass may comprise a backflow check valve.

In embodiments, the mixer may comprise a third fluid channel and respective compressor for a further fluid such as wherein, for example, the mixer is used to mix diesel and gasoline fuel with air. According to this arrangement, each of the first and third fluid channels may have a respective bypass which may be kept separate until reaching the Venturi. Furthermore, each bypass may have a respective heat exchanger interface configured differently according to the thermal properties of the fluid flowing through the respective bypass.

Whereas the present mixer has various applications including mixing fuel with air or an oxidiser, the mixer could, for example, be used submerged with respect to a water pump for pond aeration wherein the compressor creates sufficient suction to overcome water pressure to draw in atmospheric air via and air hose. In accordance with this embodiment, the present mixer is powered solely by water pressure from the water pump connected to the mixer via a water hose and, for example, a 300-750 watt water pump powered by a solar power source may be able to aerate a relatively small dam during daylight hours.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
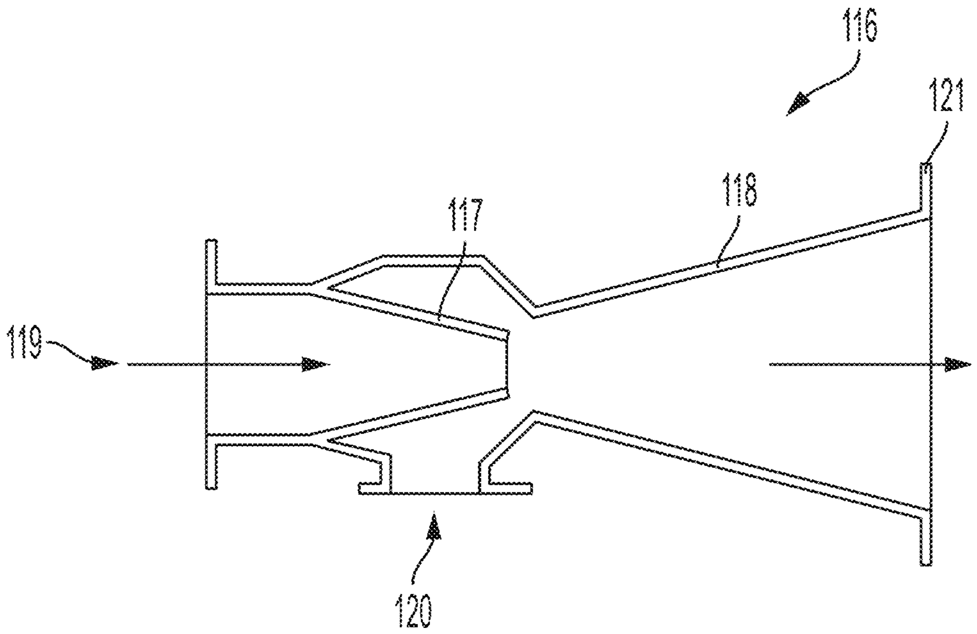
FIG. 1 (Prior Art)
FIG. 1 shows a typical Venturi mixer.
Figure 2:
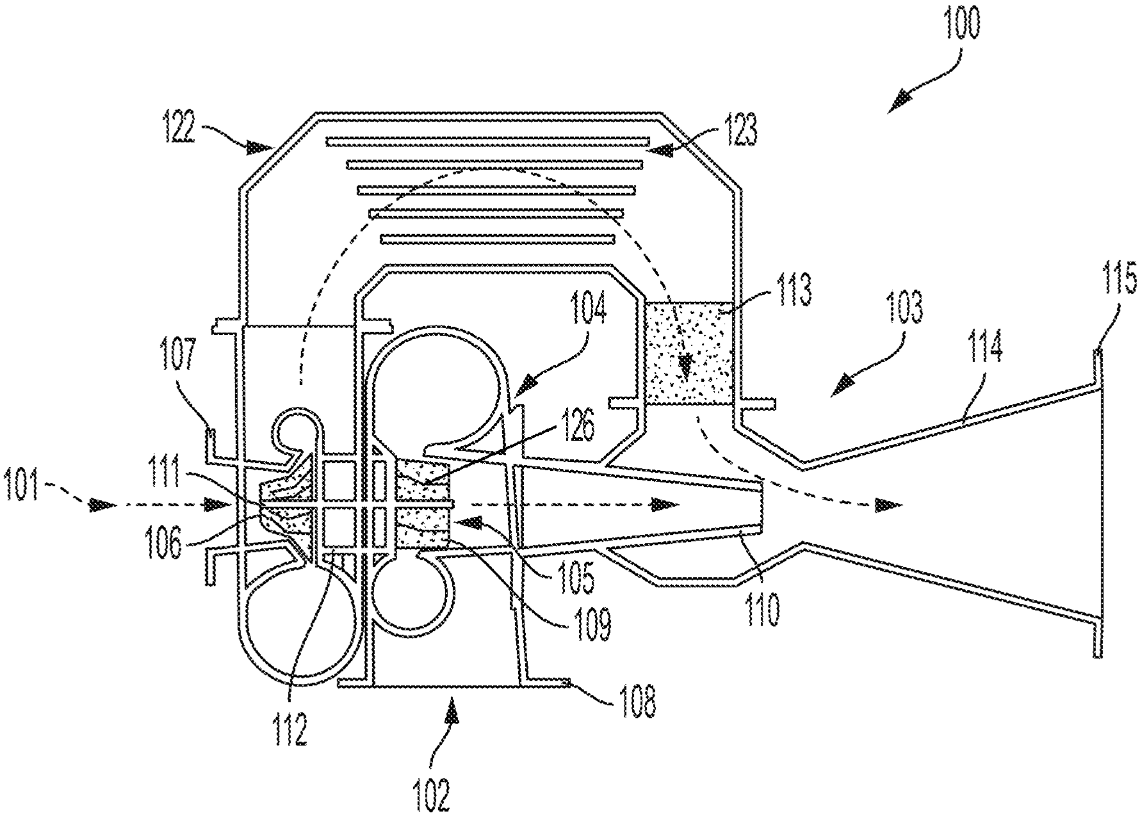
FIG. 2 shows a turbine assisted Venturi mixer in accordance with an embodiment.

A turbine assisted Venturi mixer 100 comprises a first fluid channel 101 and a second fluid channel 102 leading to a Venturi 103 for mixing fluids separately introduced via each channel 101, 102.

The Venturi 103 comprises a constricting nozzle and a dilating chamber 114 leading to an outlet 115 of the mixer 100.

The mixer 100 is used for mixing fluid separately introduced via each channel 101, 102 and wherein a mixture of the fluids exits the outlet 115.

Whereas the fluids may both be liquid or gaseous, in a preferred embodiment, the mixer 100 is used for mixing a liquid (such as water) with a gas (such as air).

The mixer 100 comprises a compressor 104 powered by a turbine 105 turned by fluid flow through the second channel 102 and which acts between the channels 101, 102 to pump fluid through the first channel 101.

In the embodiment shown, the compressor 104 comprises a compressor wheel 106 located in the first channel 101. The compressor wheel 106 may be axially orientated with respect to fluid flow via an inlet 107 of the first channel 101 so that fluid flows axially to radially with respect to the compressor wheel 106. In other words, fluid flow via the inlet 107 of the first channel 101, meets the compressor wheel 106 axially and then escapes the compressor wheel 106 radially.

The compressor wheel 106 compresses the fluid within the first channel 101 so that the fluid downstream of the compressor wheel 106 has a higher pressure than that which is upstream of the compressor wheel 106. The compressor wheel 106 may create suction via the inlet 107 of the mixer 101.

In alternative embodiments, other mechanism may be used to pump fluid via the first channel 101. For example, the compressor 104 may comprise one or more reciprocating pistons which pump fluid through the first channel 101.

The compressor wheel 106 may be used for lower density fluid, such as gases whereas pistons may be used for high-density fluids, such as liquids.

The turbine 105 may comprise a turbine wheel 109. The turbine wheel 109 may be radially orientated with respect to fluid flow via an inlet 108 of the second channel 102 so that fluid flows radially to axially with respect to the turbine wheel 106. In alternative embodiments, the second channel 102 may comprise other types of pumps such as gear, screw, rotary vane, scroll compressor, progressing cavity, peristaltic, velocity pumps and the like.

The nozzle 110 of the Venturi 103 may form part of the second channel 102. As can be seen, the nozzle 110 may constrict away from the turbine wheel 109 and may be coaxial with respect to the turbine wheel 109.

The compressor wheel 106 and the turbine wheel 109 may be fluidly separated with respect to the inlets 107 and 108 of the respective first channel 101 and second channel 102.

The compressor wheel 106 and the turbine wheel 109 may rotate coaxially and may have a common driveshaft 111 therebetween.

The mixer 101 may comprise gearing between the turbine wheel 109 and the compressor wheel 106. The gearing 112 may turn the compressor wheel 106 faster than the turbine wheel 109. The gearing 112 may have a gearing ratio in excess of 100.

In this regard, fluid for the second channel 102 may have greater density than fluid for the first channel 101. For example, the fluid for the second channel 102 may be liquid (such as water) whereas the fluid for the first channel 101 may be gaseous (such as air).

Alternatively, the gearing 112 may turn the compressor wheel 106 slower than the turbine wheel 109, such as wherein the fluid of the second channel 102 has lower density than fluid of the first channel 101.

As such, the gearing 112 may be configured depending on the phase and/or density of the fluid in each inlet 101, 102. In embodiments, the mixer 100 may comprise a configurable gearbox (not shown) between the turbine wheel 109 and the compressor wheel 106. The gearbox may have discrete ratio settings for different types of fluid combinations which may be set during use depending on the application.

For example, the gearbox may comprise a water-to-water ratio setting wherein both the first fluid channel 101 and the second fluid channel draw water 102, a gasoline-to-gasoline ratio setting for lower density gasoline liquid wherein both the first fluid channel 101 and the second fluid channel draw gasoline 102, a water-to-air ratio setting wherein the first fluid channel 101 draws water and the second fluid channel 102 draws air and an air-to-water ratio setting wherein the first fluid channel 101 draws air and the second 102 inlet draws water. As can be appreciated, the gear ratio would be higher (i.e., the compressor wheel 106 would turn relatively faster than the turbine wheel 109) at the air-to-water ratio setting as compared to the water-to-air ratio setting.

The first channel 101 may comprise a bypass 122 which may go from the compressor wheel 106 around the turbine wheel 109 to the Venturi 103.

The bypass 122 may comprise a heat exchanger interface 123. The heat exchanger interface 123 may expose greater surface contact area for passive conductive heat exchange with surrounds of the mixer 100 including where the mixer 100 is submerged in water.

The mixer 100 may further comprise a backflow check valve 113 operative to regulate or prevent reverse fluid flow via the bypass 122. The valve 113 may comprise a flap or valve which is biased to a closed position, but which opens under pressure of fluid flow via the first channel 101. A pressure release valve (not shown) may bypass the check valve 113 in case of excessive pressure buildup.

The mixer 100 may be used for pond aeration wherein the mixer 100 is submerged, the second channel 102 connected via a water hose to a water pump and the first channel 101 is connected to atmosphere via an air hose.

In embodiments, the mixer 100 may comprise more than one channel for more than one type of liquid. For example, the mixer 100 may mix a combination of fuels having differing densities and/or viscosities, such as wherein the mixer 100 uses the first fluid channel 101 for diesel fuel and has a third fluid channel (not shown) for gasoline fuel and wherein the diesel fuel and gasoline fuel are mixed with air entry via the second fluid channel 102.

In accordance with this embodiment, each of the first channel 101 and the third channel may comprise a respective compressor 104. Furthermore, the mixer 100 may comprise a separate bypass 122 for each of the first channel 101 and the third channel to keep the respective fluids separate until entering the Venturi 103. Furthermore, each separate bypass 122 may have a different configuration of heat exchanger interface 123 to dissipate heat differently according to the type of fluid flowing through the respective bypass 122. For example, each heat exchanger 123 may be configured to absorb heat differently to encourage vaporisation within the venturi depending on the type of fuel. The heat exchanger 123 may be configured to absorb heat according to the flash point of the type of fluid flow therethrough.

In further embodiments, the, driveshaft 111 may extend into the dilating chamber 114 and may comprise an impeller 126 at a distal end thereof to encourage further mixing of fluids within the dilating chamber 114.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A mixer comprising first and second fluid channels leading to a Venturi for mixing fluids separately introduced via the channels, wherein the mixer comprises a compressor powered by a turbine turned by fluid flow through the second channel and acting between the channels to pump fluid through the first channel.

2. The mixer as claimed in claim 1, wherein the compressor comprises a compressor wheel.

3. The mixer as claimed in claim 2, wherein the compressor wheel is axially orientated with respect to fluid flow via an inlet to the first channel.

4. The mixer as claimed in claim 3, wherein fluid flows from axially to radially with respect to the compressor wheel in the first channel.

5. The mixer as claimed in claim 1, wherein the turbine comprises a turbine wheel radially orientated with respect to fluid flow via an inlet of the second channel.

6. The mixer as claimed in claim 5, wherein fluid flows from radially to axially with respect to the turbine wheel in the second channel.

7. The mixer as claimed in claim 6, wherein the second channel comprises a nozzle of the Venturi, the nozzle constricting away from the turbine wheel.

8. The mixer as claimed in claim 7, wherein the nozzle and the turbine wheel are coaxial.

9. The mixer as claimed in claim 1, wherein the compressor comprises a compressor wheel in the first channel and the turbine comprises a turbine wheel and wherein the compressor wheel and turbine wheel are fluidly separated with respect to inlets of the channels.

10. The mixer as claimed in claim 1, wherein the compressor comprises a compressor wheel in the first channel and the turbine comprises a turbine wheel and wherein the compressor wheel and turbine wheel rotate coaxially.

11. The mixer as claimed in claim 1, wherein the compressor comprises a compressor wheel in the first channel and the turbine comprises a turbine wheel and wherein the mixer further comprises gearing between the turbine wheel and the compressor wheel.

12. The mixer as claimed in claim 11, wherein the gearing turns the compressor wheel faster than the turbine wheel.

13. The mixer as claimed in claim 12, wherein fluid in the second channel has greater density than fluid in the first channel.

14. The mixer as claimed in claim 13, wherein fluid in the second channel is a liquid and fluid in the first channel is a gas.

15. The mixer as claimed in claim 1, wherein the compressor comprises a compressor wheel in the first channel and the turbine comprises a turbine wheel and wherein the first channel comprises a bypass from the compressor wheel around the turbine wheel to the Venturi.

16. The mixer as claimed in claim 15, wherein the bypass comprises a heat exchanger interface.

17. The mixer as claimed in claim 16, further comprising a backflow check valve operative to prevent reverse fluid flow via the bypass.

18. The mixer as claimed in claim 1, wherein a driveshaft turned by the turbine extends into the dilating chamber and comprise an impeller at a distal end thereof to further assist mixing of fluids within the dilating chamber.

19. The mixer as claimed in claim 11, wherein the gearing is configured depending on the type of fluids entering the first and second channels.

20. The mixer as claimed in claim 19, wherein the gearing is configured depending on the phase of fluids entering the first and second channels.

21. The mixer as claimed in claim 19, wherein the gearing is configured depending on the density of fluids entering the first and second channels.

22. The mixer as claimed in claim 19, wherein the mixer comprises a configurable gearbox between the turbine wheel and the compressor wheel which has discrete ratio settings for different types of fluid combinations.

23. The mixer as claimed in claim 16, wherein the heat exchanger interface is configured to introduce heat to favour fluid vaporisation.

24. The mixer as claimed in claim 23, wherein the heat exchanger interface is configured to introduce heat according to a flash point of a type of fluid flowing therethrough.

25. The mixer as claimed in claim 16, wherein the heat exchanger interface is configured to dissipate heat compressively generated by the compressor.

26. A method of using the mixer as claimed in claim 11, the method comprising setting a gearing ratio of the gearing depending on types of fluids entering the first and second channels.

27. The method as claimed in claim 26, further comprising the mixer as claimed in claim 22, the method comprising selecting a discrete ratio setting depending on a type of fluids entering the first and second channels.

* * * * *